US010798610B2

(12) United States Patent
Hong et al.

(10) Patent No.: US 10,798,610 B2
(45) Date of Patent: Oct. 6, 2020

(54) INFORMATION ISSUING METHOD, DATA SENDING METHOD, APPARATUS AND SYSTEM (71) Applicant: Beijing Xiaomi Mobile Software Co., Ltd., Beijing (CN)

(72) Inventors: Wei Hong, Beijing (CN); Juejia Zhou, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/232,483

(22) Filed: Dec. 26, 2018

(65) Prior Publication Data
US 2019/0132770 A1 May 2, 2019

Related U.S. Application Data (63) Continuation of application No. PCT/CN2016/087581, filed on Jun. 29, 2016.

(51) Int. Cl.
*H04W 28/08* (2009.01)
*H04W 76/15* (2018.01)
(Continued)

(52) U.S. Cl.
CPC ....... *H04W 28/08* (2013.01); *H04W 72/0406* (2013.01); *H04W 76/27* (2018.02); *H04W 84/12* (2013.01)

(58) Field of Classification Search
None
See application file for complete search history.

(56) References Cited

U.S. PATENT DOCUMENTS 6,993,584 B2 * 1/2006 Border ............... H04B 7/18582
709/227
9,609,566 B2 * 3/2017 Himayat ............... H04W 36/22
(Continued)

FOREIGN PATENT DOCUMENTS

CN 105453640 A 3/2016
WO WO 2016084865 A1 6/2016

OTHER PUBLICATIONS

English version of International Search Report of PCT Application No. PCT/CN2016/087581, dated Mar. 1, 2017, issued by the ISA/CN—State Intellectual Property Office of the P.R. China.
(Continued)

*Primary Examiner* — Hong S Cho
(74) *Attorney, Agent, or Firm* — Finnegan, Henderson, Farabow, Garrett & Dunner, L.L.P.

(57) ABSTRACT

The present disclosure provides an information issuing method, a data sending method, as well as corresponding apparatus and system, and relates to communication field. The information issuing method includes: configuring, by a network access device, path information for a terminal, a Radio Resource Control (RRC) connection being established between the network access device and the terminal, the path information being configured to indicate a sending path of uplink data, and the sending path including a mobile communication link or a Wireless Local Area Network (WLAN) link; and issuing, by the network access device, the path information to the terminal, the terminal being configured to determine a target sending path of uplink data according to the path information, and send the uplink data to the network access device according to the target sending path.

18 Claims, 8 Drawing Sheets

(51) Int. Cl.
*H04W 76/11* (2018.01)
*H04W 72/12* (2009.01)
*H04W 88/06* (2009.01)
*H04W 76/27* (2018.01)
*H04W 72/04* (2009.01)
*H04W 84/12* (2009.01)

(56) References Cited

U.S. PATENT DOCUMENTS

| | | | | |
|---|---|---|---|---|
| 2013/0100928 | A1* | 4/2013 | Matsumori | H04W 36/24 370/331 |
| 2015/0043486 | A1* | 2/2015 | Ozturk | H04W 88/06 370/329 |
| 2015/0230236 | A1* | 8/2015 | Zeng | H04L 41/0806 370/329 |
| 2015/0304936 | A1 | 10/2015 | Jung et al. | |
| 2016/0192439 | A1* | 6/2016 | Phuyal | H04L 5/0048 370/315 |
| 2017/0367141 | A1* | 12/2017 | Nagasaka | H04W 76/16 |

OTHER PUBLICATIONS

*Procedures of LTE-WLAN Interworking Enhancements*, 3GPP TSG RAN WG2 Meeting #93, Malta, Feb. 15-19, 2016. 5 pgs.
Office Action dated Oct. 29, 2019, in counterpart Japanese Application No. 2018-563702.
Office Action dated Nov. 15, 2019, in counterpart Korean Application No. 10-2018-7032341.
Office Action dated Oct. 10, 2019, in counterpart Russian Application No. 2018147276/08.
Extended European Search Report dated Feb. 10, 2020, in counterpart European Application No. 16906623.0-1215/3481098.
CATT, "Flow Control for LTE-WLAN Aggregation", Discussion and Decision, 3GPP TSG RAN WG2 Meeting #90 Fukuoka, Japan, May 25-29, 2015.
MediaTek Inc., "Uplink scheduling and QoS management for enhanced LWA", Discussion and decision, 3GPP TSG-RAN#93BIS meeting Dubrovnik, Croatia, Apr. 11-15, 2016.

* cited by examiner

INFORMATION ISSUING METHOD, DATA SENDING METHOD, APPARATUS AND SYSTEM

CROSS-REFERENCE TO RELATED APPLICATIONS

This application is a continuation application of International Application No. PCT/CN2016/087581, filed on Jun. 29, 2016, the entire contents of which are incorporated herein by reference.

TECHNICAL FIELD

The present disclosure generally relates to the field of communications, and more particularly, to an information issuing method, a data sending method, as well as corresponding apparatus and system.

BACKGROUND

Long Term Evolution—Wireless Local Area Network Aggregations (LTE-WLAN Aggregations, LWA) is a technology that transmits data by using an LTE network and a WLAN network at the same time.

When a network access device transmits downlink data by using LWA, an eNB (e.g., a base station), while transmitting a part of the downlink data to a terminal via the LTE network, transmits the remaining part of the downlink data to the terminal via the WLAN network according to a Medium Access Control (MAC) address of User Equipment (UE). The terminal aggregates the two received parts of data, thereby implementing downlink transmission of the data.

SUMMARY

The present disclosure provides an information issuing method, a data sending method, as well as corresponding apparatus and system. The technical solutions are as follows.

In a first aspect, an information issuing method is provided, including: configuring, by a network access device, path information for a terminal, a Radio Resource Control (RRC) connection being established between the network access device and the terminal, the path information being configured to indicate a sending path of uplink data, and the sending path including a mobile communication link or a WLAN link; and issuing, by the network access device, the path information to the terminal, the terminal being configured to determine a target sending path of uplink data according to the path information, and send the uplink data to the network access device according to the target sending path.

In a second aspect, a data sending method is provided, including: receiving, by a terminal, path information issued by a network access device, an RRC connection being established between the network access device and the terminal, the path information being configured to indicate a sending path of uplink data, and the sending path including a mobile communication link or a WLAN link; determining, by the terminal, a target sending path of uplink data according to the path information; and sending, by the terminal, the uplink data to the network access device according to the target sending path.

In a third aspect, an information issuing apparatus is provided, including: an information configuration module, configured to configure path information for a terminal, an RRC connection being established between the network access device and the terminal, the path information being configured to indicate a sending path of uplink data, and the sending path including a mobile communication link or a WLAN link; and an information issuing module, configured to issue the path information to the terminal, the terminal being configured to determine a target sending path of uplink data according to the path information, and send the uplink data to the network access device according to the target sending path.

In a fourth aspect, a data sending apparatus is provided, including: an information receiving module, configured to receive path information issued by a network access device, an RRC connection being established between the network access device and the terminal, the path information being configured to indicate a sending path of uplink data, and the sending path including a mobile communication link or a WLAN link; a path determining module, configured to determine a target sending path of uplink data according to the path information; and a first data sending module, configured to send the uplink data to the network access device according to the target sending path.

In a fifth aspect, a network access device is provided, including: a processor; and a memory configured to store instructions executable by the processor; wherein the processor is configured to: configure path information for a terminal, an RRC connection being established between the network access device and the terminal, the path information being configured to indicate a sending path of uplink data, and the sending path including a mobile communication link or a WLAN link; and issue the path information to the terminal, the terminal being configured to determine a target sending path of uplink data according to the path information, and send the uplink data to the network access device according to the target sending path.

In a sixth aspect, a terminal is provided, including: a processor; and a memory configured to store instructions executable by the processor; wherein the processor is configured to: receive path information issued by a network access device, an RRC connection being established between the network access device and the terminal, the path information being configured to indicate a sending path of uplink data, and the sending path including a mobile communication link or a WLAN link; determine a target sending path of uplink data according to the path information; and send the uplink data to the network access device according to the target sending path.

In a seventh aspect, a mobile communication system is provided, including: a network access device and at least one terminal establishing an RRC connection with the network access device; the network access device including the information issuing apparatus as provided in the third aspect; and the terminal including the data sending apparatus as provided in the fourth aspect; or the network access device including the network access device as provided in the fifth aspect; and the terminal including the terminal as provided in the sixth aspect.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In the present disclosure, a unit may refer to a program or instruction stored in a memory and capable of implementing some functions; and a module may refer to a functional structure divided according to logic, and the module can be implemented by hardware, or a combination of software and hardware.

In the present disclosure, a network access device may be a network element configured to provide a mobile communication network accessing function in a mobile communication system.

In different mobile communication systems, the network access device has identical or similar functions, but may have different names or specific implementations. In one embodiment, the network access device is a Base Transceiver Station (BTS) in a Global System for Mobile communication (GSM) system or Code Division Multiple Access (CDMA) system. In one embodiment, the network access device is a base station (NodeB) in a Universal Mobile Telecommunications System (UMTS). In one embodiment, the network access device is an evolutional base station (evolutional Node B, eNB or e-NodeB) in Long Term Evolution (LTE) system. In actual networking, specific implementations of the network access device may be a macro base station, a micro base station, a femto base station, a repeater and so on.

In the present disclosure, a terminal may be an electronic device used by users in a mobile communication system.

In different mobile communication systems, the terminal has identical or similar functions, but may have different names or specific implementations. In one embodiment, the terminal may be a Subscriber Unit, a Subscriber Station, a Mobile Station, a Mobile, a Remote Station, an Access Point, a Remote Terminal, an Access Terminal, a User Terminal, a User Agent, a User Device, or a User Equipment (UE). In actual networking, specific implementations of the terminal may be a mobile phone, a tablet computer, a smart household appliance, a smart instrument, an Internet of Things device, an Internet of Vehicles device and so on. In embodiments of the present disclosure, the specific number and the specific installation position of the terminals is not limited.

In the present disclosure, a WLAN Termination (WT) is a logical network element defined in a LWA system, which manages a WLAN wireless access point (AP).

In the LWA system, a WT and an eNB are connected with each other in a one-to-one correspondence way, and are usually fixed together. One WT can be connected with multiple WLAN APs at the same time, and responsible for monitoring and managing each WLAN AP connected therewith. In the LWA system, when the network access device transmits a downlink data packet to the terminal through a WLAN link, or receives, through the WLAN link, an uplink data packet transmitted by the terminal, the downlink data packet and the uplink data packet both pass through the WT connected with the network access device.

In the present disclosure, an AP may be a node configured to provide, in a WLAN, WLAN access capability to the terminal.

For ease of description, in embodiments of the present disclosure, schematic description is made by taking as an example that the network access device is an eNB and an LTE link and a WLAN link are included between the network access device and the terminal, which does not limit the present disclosure.

Figure 1:
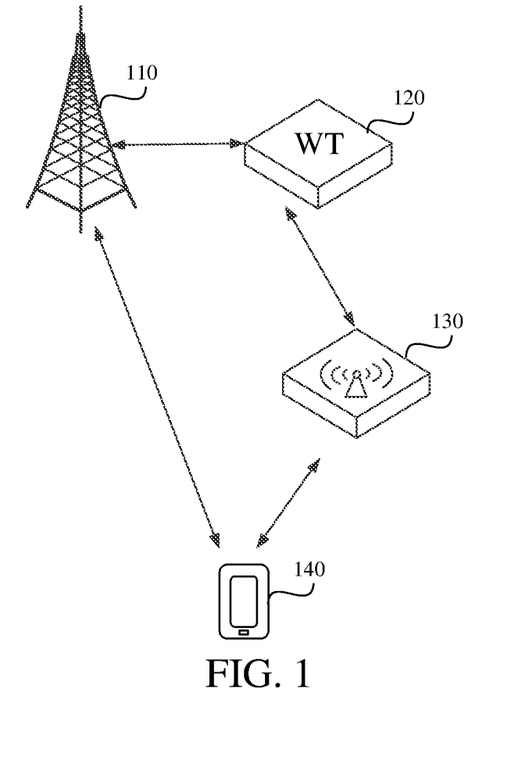
FIG. 1 is a schematic diagram showing a mobile communication system according to an exemplary embodiment.

FIG. 1 is a schematic diagram showing a mobile communication system according to an exemplary embodiment. The mobile communication system includes: a network access device 110, a WT 120, a WLAN AP 130, and a terminal 140.

In one embodiment, the network access device 110 is an eNB in LTE. The network access device 110 is configured to send downlink data through an LTE link and a WLAN link, and the network access device 110 is further configured to receive uplink data through the LTE link and the WLAN link. Suppose that first downlink data and first uplink data are transmitted through the LTE link and second downlink data and second uplink data are transmitted through the WLAN link, then the network access device 110 can encapsulate data from a core network as first downlink data and second downlink data, send the first downlink data to the terminal through the LTE link, and send the second downlink data to the terminal through the WLAN link. The network access device 110 can further receive first uplink data through the LTE link, receive second uplink data through the WLAN link, aggregate the received first uplink data and second uplink data, and send the aggregated uplink data to the core network.

The network access device 110 and the WT 120 are connected with each other in a one-to-one correspondence way, and in general, the network access device 110 may be fixed together with the WT 120, for example, they are formed on the same main board; or the network access device 110 and the WT 120 are connected with each other through optic fibers. As shown in FIG. 1, the network access device 110 and the WT 120 are connected with each other correspondingly.

The WT 120 is configured to send second downlink data and receive second uplink data. The WT 120 may be connected with multiple WLAN APs 130, and receive the second uplink data sent by each WLAN AP 130 or transmit the second downlink data to the WLAN APs 130 connected therewith. In embodiments of the present disclosure, the number of the WTs 1020 and the WLAN APs 130 is not limited.

The WLAN AP 130 is configured to send the second downlink data and receive the second uplink data. In actual networking, the WLAN AP 130 may be an electronic device such as wireless router or a wireless gateway. The WLAN AP 130 may be connected with multiple WTs 120 at the same time.

The terminal 140 is configured to send first uplink data and second uplink data and receive first downlink data and second downlink data. In addition, the terminal 140 further has a LWA function, that is, when the received downlink data includes first downlink data and second downlink data, the terminal 140 can aggregate the first downlink data and the second downlink data. The terminal 140 may further divide the uplink data into first uplink data and second uplink data, send the first uplink data to the network access device 110 through the LTE link, and send the second uplink data to the network access device 110 through the WLAN link. In embodiments of the present disclosure, the specific number and the specific position of the terminal 140 is not limited.

Figure 2:
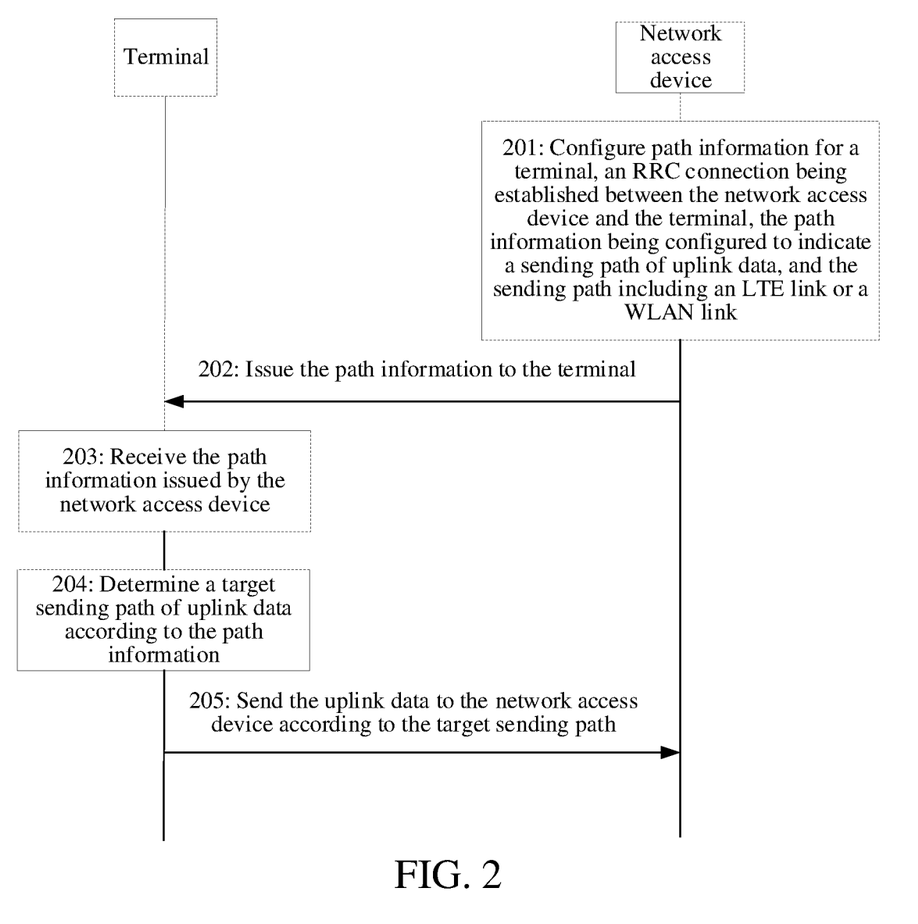
FIG. 2 is a flow chart of a data transmission method according to an exemplary embodiment.

FIG. 2 is a flow chart of a data transmission method according to an exemplary embodiment. This embodiment is illustrated by taking that the data transmission method is applied to the mobile communication system shown in FIG. 1 as an example. The method includes following steps.

In step 201, a network access device configures path information for a terminal, a radio resource control (RRC) connection being established between the network access device and the terminal, the path information being configured to indicate a sending path of uplink data, and the sending path including an LTE link or a WLAN link.

When the network access device receives data from a core network and issues the data to the terminal, it is possible to, according to a current link condition and a preconfigured sending strategy, determine which data is transmitted through the LTE link and which data is transmitted through the WLAN link. In this embodiment, in order to enable the terminal to make full use of the LTE link and the WLAN link, the network access device configures respective path information for the terminal establishing an RRC connection, thereby instructing the terminal to transmit uplink data through which link.

In step 202, the network access device issues the path information to the terminal.

After entering a cell within coverage of the network access device, the terminal establishes an RRC connection with the network access device, and receives system information broadcast by the network access device or RRC signaling sent (e.g., unicast) by the network access device.

In one embodiment, the network access device may add generated path information to the system information, and send the system information to respective terminals establishing the RRC connection by means of broadcasting.

In one embodiment, the network access device may further add generated path information to the RRC signaling, and send it through the RRC connection with the terminal.

In step 203, the terminal receives the path information issued by the network access device.

In one embodiment, the terminal receives the system information broadcast by the network access device, and acquires the path information from the system information.

In one embodiment, the terminal receives the RRC signaling sent by the network access device, and acquires the path information from the RRC signaling.

In step 204, the terminal determines a target sending path of uplink data according to the path information.

The terminal determines, according to the acquired path information, a target sending path used when uplink data is sent.

In step 205, the terminal sends the uplink data to the network access device according to the target sending path.

It should be noted that the uplink data sent by the terminal to the network access device is uplink data aggregated and transmitted through LWA. In other words, the network access device, after receiving LTE uplink data and WLAN uplink data uploaded by the terminal, needs to aggregate the LTE uplink data and the WLAN uplink data, to send the aggregated data to the core network.

Different from the terminal's sending uplink data to the network access device only through an LTE link in the related art, based on the path information configured by the network access device, the terminal can transmit uplink data through an LTE link and a WLAN link, for example, the uplink data is sent by shunt, which avoids congestion of the LTE link caused by sending the uplink data only through the LTE link. At the same time, transmitting some data by using the WLAN link improves data transmission efficiency.

In summary, with the data transmission method according to this embodiment, the network access device configures path information for the terminal establishing an RRC connection, and issues the path information to the terminal, such that the terminal receiving the path information can send uplink data according to a sending path indicated by the path information, which solves the problem in the related art that the terminal's sending uplink data only through a mobile communication link causes congestion of the mobile communication link and affects uplink data transmission efficiency and performance of the mobile communication system; achieves that a terminal sends uplink data based on a sending path configured by a network access device, makes full use of a mobile communication link and a WLAN link for data transmission, avoids congestion caused by use of a single link, and improves uplink data transmission efficiency and performance of a mobile communication system.

It should be noted that step 201 and step 202 described above may be implemented as an information issuing method at a side of a network access device, and step 203 to step 205 described above may be implemented as a data sending method at a side of a terminal, which are no longer repeated herein.

As shown in FIG. 1, the network access device 110 in the mobile communication system may send system information to each terminal 140 in a cell by means of broadcasting, and through the system information, the terminal 140 may know network features and other information of the cell.

Therefore, in one implementation, the network access device may configure identical path information for respective terminals in the cell uniformly, and send the system information to the terminals by broadcast. An exemplary embodiment is used for description in the following.

Figure 3A:
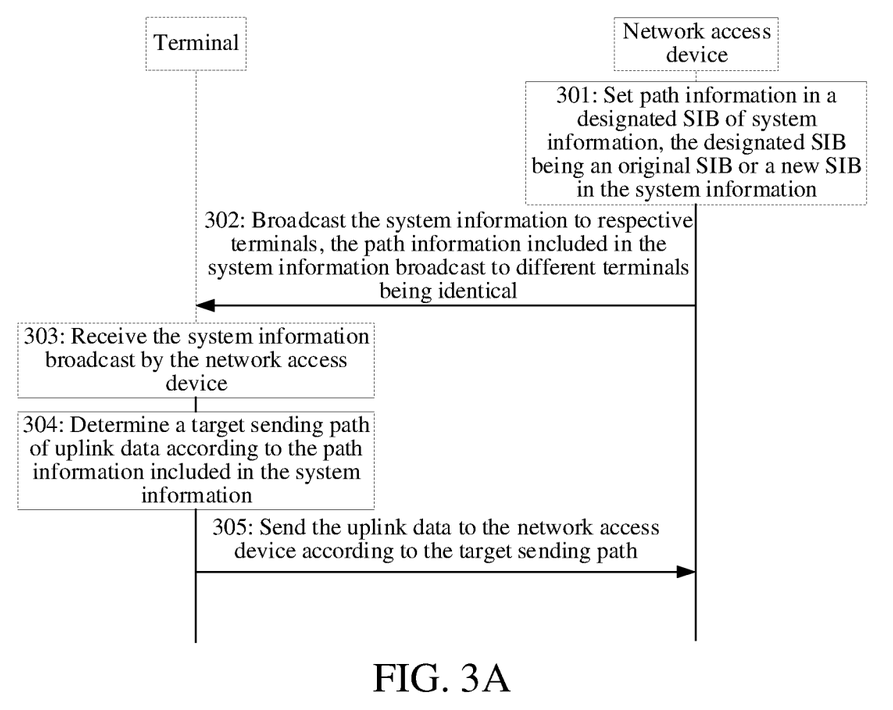
FIG. 3A is a flow chart of a data transmission method according to an exemplary embodiment.

FIG. 3A is a flow chart of a data transmission method according to an exemplary embodiment. This embodiment is illustrated by taking that the data transmission method is applied to the mobile communication system shown in FIG. 1 as an example. The method includes following steps.

In step 301, the network access device sets the path information in a designated System Information Block (SIB) of system information, the designated SIB being an original SIB or a new SIB in the system information.

The system information broadcast by the network access device includes one Master Information Block (MIB) and multiple SIBs. The MIB includes a finite number of most important and most common transmission parameters, and is transmitted through a Physical Broadcast Channel (PBCH); the SIBs are used for carrying System Information (SI), and are transmitted through a Physical Downlink Shared Channel (PDSCH), in which a mapping relationship between the SIBs and the SI may be configured flexibly. In this embodiment, the SIB in the system information includes the path information configured for the terminal.

The network access device may acquire link conditions of the LTE link and the WLAN link and data transmission quality in real time by sending a reference signal, thus determining to instruct the terminal to send uplink data through which path. For example, when the link condition of the LTE link is worse (or the data transmission quality is worse) but the link condition of the WLAN link is better (or the data transmission quality is better), the network access device determines to instruct the terminal to send the uplink data through the WLAN link. It should be noted that, in other implementations, the network access device may further determine a path of sending the uplink data by the terminal according to a preset sending strategy (data having higher requirements for timeliness is transmitted through the LTE link, and data having lower requirements for timeliness is transmitted through the WLAN link), which is not limited in this embodiment.

The network access device generates corresponding path information according to the determined sending path, and adds the path information to a designated SIB in the system information. The designated SIB may be an original SIB (e.g., SIB1) in the system information, and may also be a new SIB (e.g., SIB19, SIB20 and so on) in the system information.

In one implementation, a data type of the path information is Boolean. When a value of the path information is true, the target sending path is the LTE link; and when the value of the path information is false, the target sending path is the WLAN link. Or, when a value of the path information is true, the target sending path is the WLAN link; and when the value of the path information is false, the target sending path is the LTE link.

For example, the network access device may add a flag bit (Indication) to the SIB1, for indicating a sending path of the uplink data. When a value of the flag bit is true, the sending path of the uplink data is indicated to be the LTE link; and when the value of the flag bit is false, the sending path of the uplink data is indicated to be the WLAN link.

It should be noted that this embodiment is schematically described only with the above implementations, which does not limit a specific manner of setting the path information.

In step 302, the network access device broadcasts the system information to respective terminals, in which the path information included in the system information broadcast to different terminals is identical.

After setting the path information is completed, the network access device sends the system information to respective terminals establishing the RRC connection by means of broadcasting, in which the path information included in the system information broadcast to different terminals is identical, that is, in a cell within coverage of the network access device, path information received by respective terminals is identical.

In step 303, the terminals receive the system information broadcast by the network access device.

Correspondingly, the terminals receive the system information, and acquire the path information included in the system information.

In one implementation, the terminals detect whether the system information includes a designated SIB, and when the system information includes a designated SIB, further acquire path information included in the SIB.

In step 304, the terminals determine a target sending path of the uplink data according to the path information included in the system information.

The terminals further determine a target sending path of the uplink data according to the acquired path information.

In one implementation, a data type of the path information included in the system information is Boolean. When a value of the path information is true, the terminals determine the target sending path as the LTE link; and when the value of the path information is false, the terminals determine the target sending path as the WLAN link. Or, when a value of the path information is true, the terminals determine the target sending path as the WLAN link; and when the value of the path information is false, the terminals determine the target sending path as the LTE link.

In other implementations, when the path information in the system information is stored in other data types, the terminals may use a corresponding interpretation manner to determine a target sending path indicated by the path information, which is not limited in this embodiment.

In step 305, the terminals send the uplink data to the network access device according to the target sending path.

When needing to send the uplink data to the network access device, the terminals, after encapsulating the uplink data, send the data through a corresponding sending path, thus implementing shunt transmission of the uplink data.

For example, when the path information instructs the terminals to send uplink data having higher requirements for timeliness through the LTE link and to send uplink data having lower requirements for timeliness through the WLAN link, the terminals encapsulate the uplink data having higher requirements for timeliness as an LTE data packet and sends the LTE data packet to the network access device through the LTE link; at the same time, the terminals encapsulate the uplink data having lower requirements for timeliness as a WLAN data packet and send the WLAN data packet to the network access device through the WLAN link.

In summary, with the data transmission method according to this embodiment, the network access device configures path information for terminals establishing an RRC connection, and issues the path information to the terminals, such that the terminals receiving the path information can send uplink data according to a sending path indicated by the path information, which solves the problem in the related art that the terminals' sending uplink data only through a mobile communication link causes congestion of the mobile communication link and affects uplink data transmission efficiency and performance of the mobile communication system; achieves that terminals send uplink data based on a sending path configured by a network access device, makes full use of a mobile communication link and a WLAN link for data transmission, avoids congestion caused by use of a single link, and improves uplink data transmission efficiency and performance of a mobile communication system.

In this embodiment, the network access device adds path information to system information and broadcasts the system information to respective terminals, achieving uniform configuration for all the terminals in a cell, having higher configuration efficiency, and reducing an upgrade cost of the whole mobile communication system.

Figure 3B:
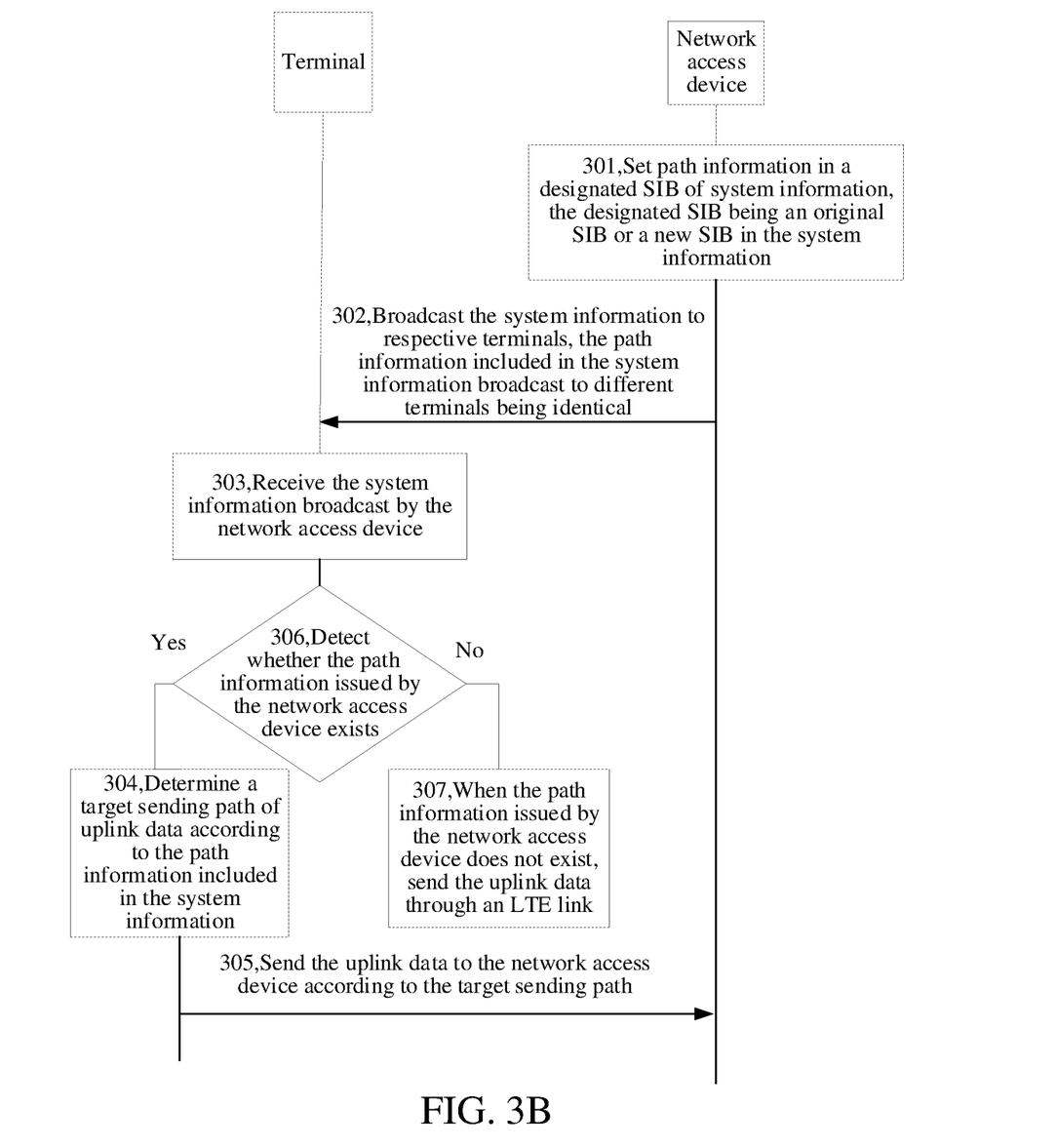
FIG. 3B is a flow chart of a data transmission method according to an exemplary embodiment.

In other implementations, when path information is not configured in the received system information, the terminal sends the uplink data according to a default path (e.g., the LTE path), and when path information is configured in the received system information, the terminal transmits the uplink data according to a sending path indicated by the path information. In one embodiment, as shown in FIG. 3B, the method may further include the following steps.

In step 306, the terminal detects whether the path information issued by the network access device exists.

The terminal detects whether the system information broadcast by the network access device includes a designated SIB. If the system information does not include the designated SIB, the following step 307 is performed; if the system information includes the designated SIB, the terminal further detects whether the designated SIB includes a designated flag bit (for indicating path information), and when the designated SIB includes the designated flag bit, step 304 is performed; and when the designated SIB does not include the designated flag bit, the following step 307 is performed.

In step 307, when the path information issued by the network access device does not exist, the terminal sends the uplink data through the LTE link.

When it is detected that the system information does not include the path information, the terminal sends the uplink data through the LTE link (default path).

It should be noted that step 301 and step 302 described above may be implemented as an information issuing method at a side of a network access device, and step 303 to step 307 described above may be implemented as a data sending method at a side of a terminal, which are no longer repeated herein.

In another implementation, in order to configure different sending paths for different terminals, the network access device may configure different path information for different terminals, and send the path information to the corresponding terminal by unicast RRC signaling. Description is given below by using an exemplary embodiment.

Figure 4A:
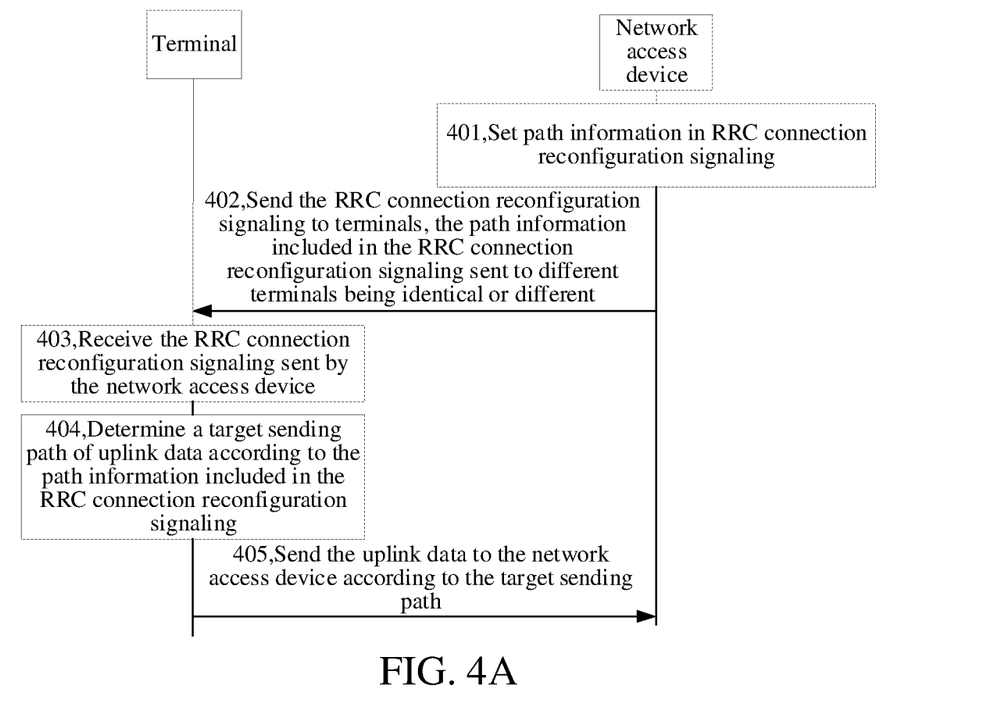
FIG. 4A is a flow chart of a data transmission method according to an exemplary embodiment.

FIG. 4A is a flow chart of a data transmission method according to an exemplary embodiment. This embodiment is illustrated by taking that the data transmission method is applied to the mobile communication system shown in FIG. 1 as an example. The method includes following steps.

In step 401, the network access device sets path information in RRC connection reconfiguration signaling.

The RRC connection reconfiguration signaling is used for modifying the RRC connection between the network access device and the terminal, specifically implementing measurement configuration modification, switching radio bearer, configuring radio bearer, data radio bearer, transmission channels, physical channels and so on. In this embodiment, the network access device configures the path information in the RRC connection reconfiguration signaling.

In order to implement different configuration, the network access device may configure different path information for different terminals according to traffic use conditions, network support conditions and other information of respective terminals in the cell, and add the path information to the RRC connection reconfiguration signaling, facilitating subsequent sending of the path information to the corresponding terminals.

In one implementation, a data type of the path information is Boolean. When a value of the path information is true, the target sending path is the LTE link; and when the value of the path information is false, the target sending path is the WLAN link. Or, when a value of the path information is true, the target sending path is the WLAN link; and when the value of the path information is false, the target sending path is the LTE link.

For example, the network access device may acquire a traffic use condition of the terminal. When the traffic use condition indicates that the remaining traffic of the terminal is greater than a threshold, in order to improve stability and reliability of sending the uplink data, the target sending path configured by the network access device for the terminal is an LTE link, and a value of the path information in the RRC connection reconfiguration signaling is set as true. When the traffic use condition indicates that the remaining traffic of the terminal is less than the threshold, the target sending path configured by the network access device for the terminal is a WLAN link, and the value of the path information in the RRC connection reconfiguration signaling is set as false.

It should be noted that this embodiment is schematically described only with the above implementations, which does not limit a specific manner of setting the path information.

In step 402, the network access device sends the RRC connection reconfiguration signaling to terminals, in which the path information included in the RRC connection reconfiguration signaling sent to different terminals is identical or different.

After setting the path information is completed in the RRC connection reconfiguration signaling, the network access device sends the RRC connection reconfiguration signaling to the corresponding terminal by unicast. The path information included in the RRC connection reconfiguration signaling sent to different terminals is identical or different, that is, the sending paths of the uplink data configured by the network access device for respective terminals in the cell are identical or different.

It should be noted that the network access device may further combine broadcast with unicast to uniformly configure path information for a large number of terminals in the cell by broadcast and then configure path information for a small number of terminals in the cell separately by unicast (in which the priority of the path information configured by unicast is higher than that of the path information configured by broadcast, that is, the terminal preferentially transmits the uplink data according to the path information configured by unicast), which is not limited in the present disclosure.

In step 403, the terminals receive the RRC connection reconfiguration signaling sent by the network access device.

Correspondingly, the terminals receive the RRC connection reconfiguration signaling sent by the network access device, and acquire the path information included in the RRC connection reconfiguration signaling.

In step 404, the terminals determine the target sending path of uplink data according to the path information included in the RRC connection reconfiguration signaling.

Further, the terminals determine the sending path of the uplink data according to the acquired path information.

In one implementation, a data type of the path information included in the RRC connection reconfiguration signaling is Boolean. When a value of the path information is true, the terminals determine the target sending path as the LTE link; and when the value of the path information is false, the terminals determine the target sending path as the WLAN link. Or, when a value of the path information is true, the terminals determine the target sending path as the WLAN link; and when the value of the path information is false, the terminals determine the target sending path as the LTE link.

In other implementations, when the path information in the system information is stored in other data types, the terminals may use a corresponding interpretation manner to determine a target sending path indicated by the path information, which is not limited in this embodiment.

In step 405, the terminals send the uplink data to the network access device according to the target sending path.

Similar to step 305 described above, when needing to send the uplink data to the network access device, the terminals, after encapsulating the uplink data, send the data through a corresponding sending path, thus implementing shunt transmission of the uplink data.

In summary, with the data transmission method according to this embodiment, the network access device configures path information for terminals establishing an RRC connection, and issues the path information to the terminals, such that the terminals receiving the path information can send uplink data according to a sending path indicated by the path information, which solves the problem in the related art that the terminals' sending uplink data only through a mobile communication link causes congestion of the mobile communication link and affects uplink data transmission efficiency and performance of the mobile communication system, achieves that the terminals send uplink data based on a sending path configured by a network access device, makes full use of a mobile communication link and a WLAN link for data transmission, avoids congestion caused by use of a single link, and improves uplink data transmission efficiency and performance of a mobile communication system.

In this embodiment, the network access device adds path information to the RRC connection reconfiguration signaling, and sends the RRC connection reconfiguration signaling to corresponding terminals by unicast, thus implementing targeted configuration for terminals in the cell.

Figure 4B:
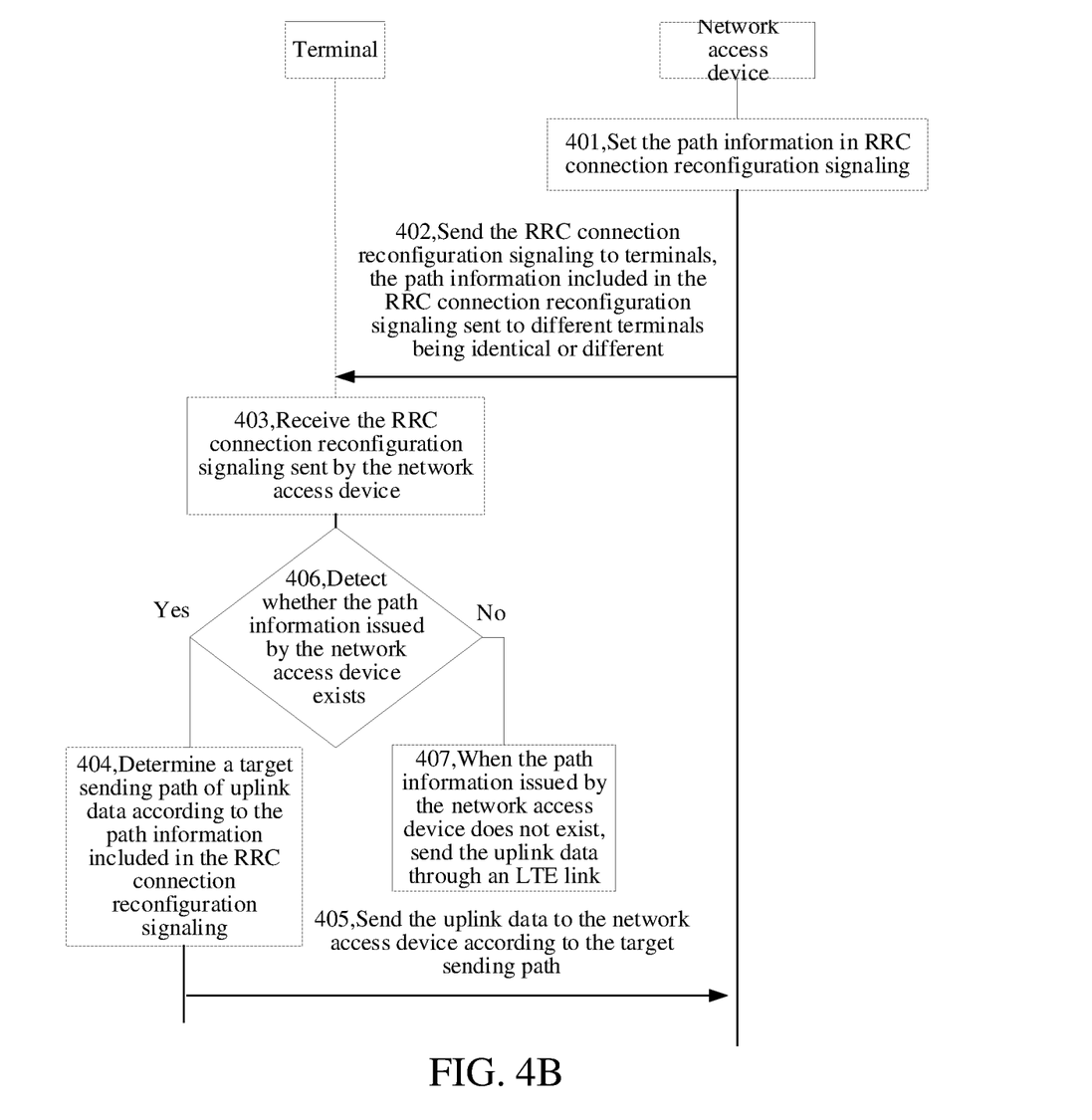
FIG. 4B is a flow chart of a data transmission method according to an exemplary embodiment.

In other implementations, when path information is not configured in the received RRC connection reconfiguration signaling, the terminals send the uplink data according to a default path (e.g., the LTE path), and when path information is configured in the received RRC connection reconfiguration signaling, the terminals transmit the uplink data according to a sending path indicated by the path information. In one embodiment, as shown in FIG. 4B, the method may further include the following steps.

In step 406, the terminals detect whether the path information issued by the network access device exists.

The terminals detect whether the RRC connection reconfiguration signaling sent by the network access device includes path information. If the RRC connection reconfiguration signaling includes the path information, step 404 is performed; and if the RRC connection reconfiguration signaling does not include the path information, the following step 407 is performed.

In step 407, when the path information issued by the network access device does not exist, the terminals send the uplink data through the LTE link.

When detecting that the RRC connection reconfiguration signaling does not include the path information, the terminals send the uplink data through the LTE link (default path).

It should be noted that step 401 and step 402 may be implemented as an information issuing method at a side of a network access device, and step 403 to step 407 described above may be implemented as a data sending method at a side of a terminal, which are no longer repeated herein.

The followings are apparatus embodiments of the present disclosure, which can be used for performing the method embodiments of the present disclosure.

Figure 5:
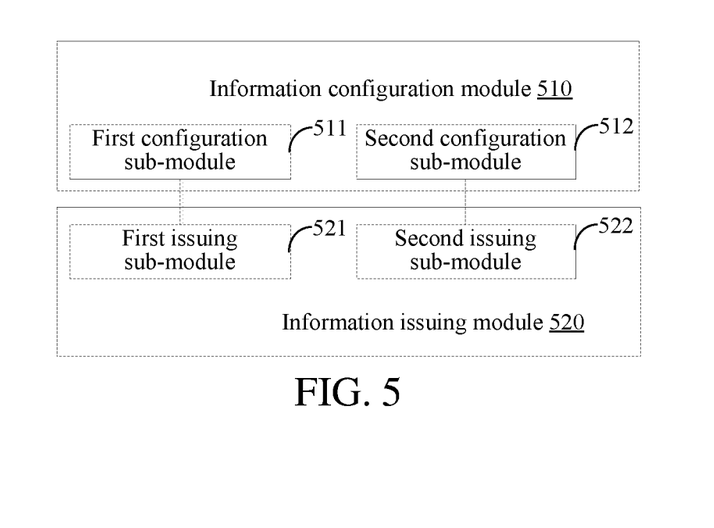
FIG. 5 is a block diagram of an information issuing apparatus according to an exemplary embodiment.

FIG. 5 is a block diagram of an information issuing apparatus according to an exemplary embodiment. The information issuing apparatus may be implemented as whole or part of the network access device 110 in FIG. 1 through a dedicated hardware circuit or a combination of software and hardware. The information issuing apparatus includes an information configuration module 510 and an information issuing module 520.

The information configuration module 510 is configured to configure path information for a terminal, an RRC connection being established between the network access device and the terminal, the path information being configured to indicate a sending path of uplink data, and the sending path including a mobile communication link or a WLAN link.

The information issuing module 520 is configured to issue the path information to the terminal, the terminal being configured to determine a target sending path of uplink data according to the path information, and send the uplink data to the network access device according to the target sending path.

In one embodiment, the information configuration module 510 includes a first configuration sub-module 511.

The first configuration sub-module 511 is configured to set the path information in a designated SIB of system information, the designated SIB being an original SIB or a new SIB in the system information.

In one embodiment, the information issuing module 520 includes a first issuing sub-module 521.

The first issuing sub-module 521 is configured to broadcast the system information to respective terminals, the terminals being configured to determine the target sending path according to the path information included in the designated SIB of the system information, and send the uplink data to the network access device through the target sending path, in which the path information included in the system information broadcast to different terminals is identical.

In one embodiment, the information configuration module 510 includes a second configuration sub-module 512.

The second configuration sub-module 512 is configured to set the path information in RRC connection reconfiguration signaling.

In one embodiment, the information issuing module 520 includes a second issuing sub-module 522.

The second issuing sub-module 522 is configured to send the RRC connection reconfiguration signaling to the terminals, the terminals being configured to determine the target sending path according to the path information included in the RRC connection reconfiguration signaling, and send the uplink data to the network access device through the target sending path, in which the path information included in the RRC connection reconfiguration signaling sent to different terminals are identical or different.

In one embodiment, a data type of the path information is Boolean. When a value of the path information is true, the target sending path is the mobile communication link; and when the value of the path information is false, the target sending path is the WLAN link. Or, when a value of the path information is true, the target sending path is the WLAN link; and when the value of the path information is false, the target sending path is the mobile communication link.

In summary, with the information issuing apparatus according to this embodiment, a network access device configures path information for terminals establishing an RRC connection, and issues the path information to the terminals, such that the terminals receiving the path information can send uplink data according to a sending path indicated by the path information, which solves the problem in the related art that the terminals' sending uplink data only through a mobile communication link causes congestion of the mobile communication link and affects uplink data transmission efficiency and performance of the mobile communication system; achieves that terminals send uplink data based on a sending path configured by a network access device, makes full use of a mobile communication link and a WLAN link for data transmission, avoids congestion caused by use of a single link, and improves uplink data transmission efficiency and performance of a mobile communication system.

In this embodiment, the network access device adds path information to system information and broadcasts the system information to respective terminals, achieving uniform configuration for all the terminals in a cell, having higher configuration efficiency, and reducing an upgrade cost of the whole mobile communication system.

In this embodiment, the network access device adds path information to the RRC connection reconfiguration signaling, and sends the RRC connection reconfiguration signaling to corresponding terminals by unicast, thus implementing targeted configuration for terminals in the cell.

Figure 6:
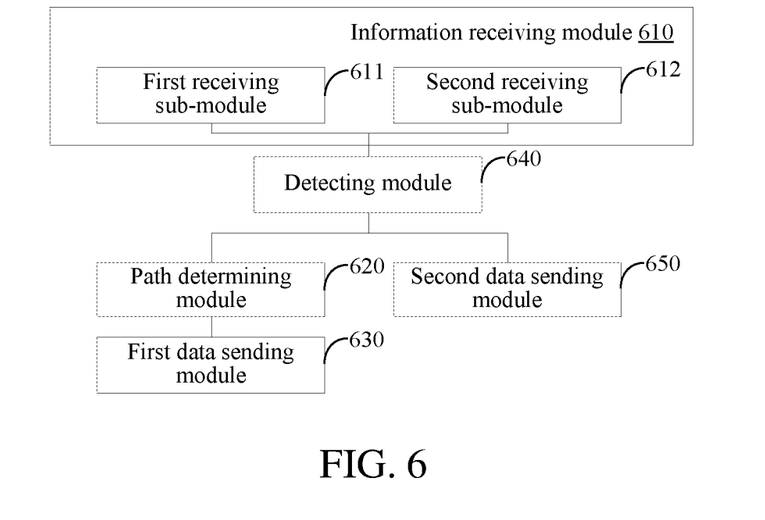
FIG. 6 is a block diagram of a data sending apparatus according to an exemplary embodiment.

FIG. 6 is a block diagram of a data sending apparatus according to an exemplary embodiment. The data sending apparatus may be implemented as whole or part of the terminal 140 in FIG. 1 through a dedicated hardware circuit or a combination of software and hardware. The data sending apparatus includes an information receiving module 610, a path determining module 620, and a first data sending module 630.

The information receiving module 610 is configured to receive path information issued by a network access device, an RRC connection being established between the network access device and the terminal, the path information being configured to indicate a sending path of uplink data, and the sending path including a mobile communication link or a WLAN link.

The path determining module 620 is configured to determine a target sending path of uplink data according to the path information.

The first data sending module 630 is configured to send the uplink data to the network access device according to the target sending path.

In one embodiment, the information receiving module 610 includes a first receiving sub-module 611.

The first receiving sub-module 611 is configured to receive system information broadcast by the network access device, a designated System Information Block (SIB) of the system information including the path information, and the designated SIB being an original SIB or a new SIB in the system information.

In one embodiment, the information receiving module 610 includes a second receiving sub-module 612.

The second receiving sub-module 612 is configured to receive RRC connection reconfiguration signaling sent by the network access device, the RRC connection reconfiguration signaling including the path information, and the path information included in the RRC connection reconfiguration signaling sent to different terminals being identical or different.

In one embodiment, a data type of the path information is Boolean. The path determining module 620 is configured to determine the target sending path as the mobile communication link when a value of the path information is true, determine the target sending path as the WLAN link when the value of the path information is false. Or, the path determining module is configured to determine the target sending path as the WLAN link when a value of the path information is true, and determine the target sending path as the mobile communication link when the value of the path information is false.

In one embodiment, the apparatus further includes a detecting module 640 and a second data sending module 650.

The detecting module 640 is configured to detect whether the path information issued by the network access device exists.

The path determining module 620 is configured to determine a target sending path of uplink data according to the path information when the path information issued by the network access device exists.

The second data sending module 650 is configured to send the uplink data through the LTE link, when the path information issued by the network access device does not exist.

In summary, with the data sending apparatus according to this embodiment, a network access device configures path information for terminals establishing an RRC connection, and issues the path information to the terminals, such that the terminals receiving the path information can send uplink data according to a sending path indicated by the path information, which solves the problem in the related art that the terminals' sending uplink data only through a mobile communication link causes congestion of the mobile communication link and affects uplink data transmission efficiency and performance of the mobile communication system; achieves that terminals send uplink data based on a sending path configured by a network access device, makes full use of a mobile communication link and a WLAN link for data transmission, avoids congestion caused by use of a single link, and improves uplink data transmission efficiency and performance of a mobile communication system.

In this embodiment, the network access device adds path information to system information and broadcasts the system information to respective terminals, achieving uniform configuration for all the terminals in a cell, having higher configuration efficiency, and reducing an upgrade cost of the whole mobile communication system.

In this embodiment, the network access device adds path information to the RRC connection reconfiguration signaling, and sends the RRC connection reconfiguration signaling to corresponding terminals by unicast, thus implementing targeted configuration for terminals in the cell.

Figure 7:
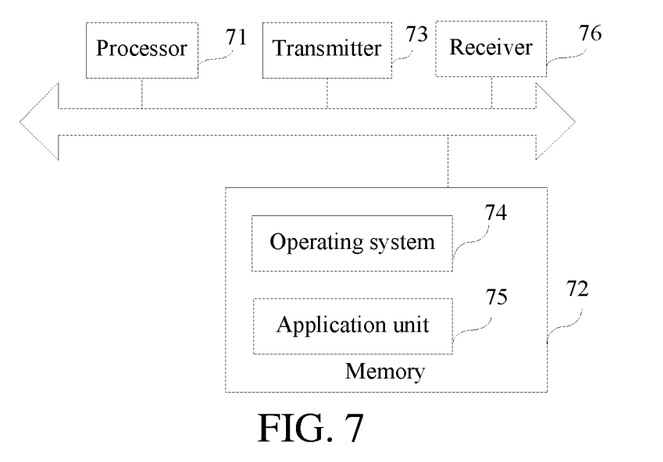
FIG. 7 is a schematic diagram of a network access device according to an exemplary embodiment.

FIG. 7 is a schematic diagram of the network access device 110 (FIG. 1) according to an exemplary embodiment. The network access device 110 includes: a processor 71, a memory 72, a transmitter 73, and a receiver 74.

The processor 71 is connected with the memory 72.

The processor 71 includes one or more processing cores, and the processor 71 executes various functional applications and information processing by running software programs and units.

The memory 72 may be configured to store one or more program instructions, the one or more program instructions being used for implementing at least one software program and module. The memory 72 may store an operating system 74 and an application module 75 required by at least one function. The processor 71 is configured to execute the program instructions in the memory 72, to implement the steps performed by the network access device 110 as in the above method embodiments.

In addition, the memory 72 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The transmitter 73 includes a modem unit and a Multiple Input Multiple Output (MIMO) antenna, in which the MIMO antenna is an antenna that supports transmitting and receiving of multiple antenna ports. In one embodiment, the MIMO antenna includes at least two transmitting antennas. In one embodiment, the transmitter 73 is configured to implement data and signaling transmission.

The receiver 76 includes a structure identical with or similar to that of the transmitter 73. In one embodiment, the receiver 76 includes a modem unit and a MIMO antenna, in which the MIMO antenna includes at least two receiving antennas.

Those skilled in the art can understand that the structure of the network access device 110 shown in FIG. 7 does not limit the network access device 110, which may include more or fewer components than those illustrated or combine some components, or have different configuration of components.

Figure 8:
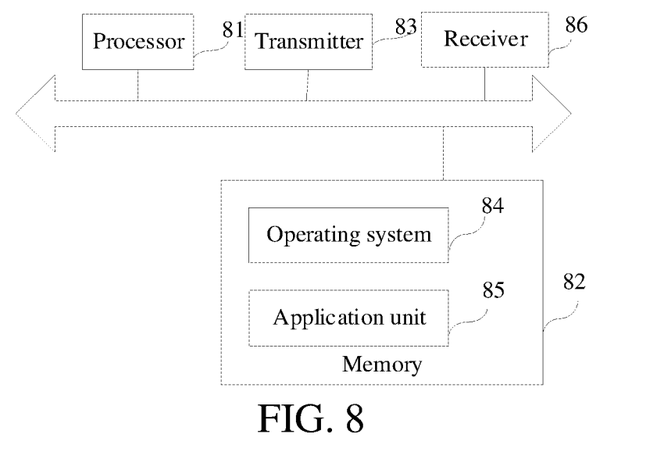
FIG. 8 is a schematic diagram of a terminal according to an exemplary embodiment.

FIG. 8 is a schematic diagram of the terminal 140 (FIG. 1) according to an exemplary embodiment. The terminal 140 includes: a processor 81, a memory 82, a transmitter 83, and a receiver 84.

The processor 81 is connected with the memory 82.

The processor 81 includes one or more processing cores, and the processor 81 executes various functional applications and information processing by running software programs and units.

The memory 82 may be configured to store one or more program instructions, the one or more program instructions being used for implementing at least one software program and module. The memory 82 may store an operating system 84 and an application module 85 required by at least one function. The processor 81 is configured to execute the program instructions in the memory 82, to implement the steps performed by the terminal 140 as in the above method embodiments.

In addition, the memory 82 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The transmitter 83 includes a modem unit and a Multiple Input Multiple Output (MIMO) antenna, in which the MIMO antenna is an antenna that supports transmitting and receiving of multiple antenna ports. In one embodiment, the MIMO antenna includes at least two transmitting antennas. In one embodiment, the transmitter 83 is configured to implement data and signaling transmission.

The receiver 86 includes a structure identical with or similar to that of the transmitter 83. In one embodiment, the receiver 86 includes a modem unit and a MIMO antenna, in which the MIMO antenna includes at least two receiving antennas.

Those skilled in the art can understand that the structure of the terminal 140 shown in FIG. 8 does not limit the terminal 140, which may include more or fewer components than those illustrated or combine some components, or have different configuration of components.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An information issuing method, comprising:
configuring, by a network access device, path information for a terminal, a Radio Resource Control (RRC) connection being established between the network access device and the terminal, the path information being configured to indicate a sending path of uplink data, and the sending path including a mobile communication link or a Wireless Local Area Network (WLAN) link; and
issuing, by the network access device, the path information to the terminal, the terminal being configured to determine a target sending path of uplink data according to the path information, and send the uplink data to the network access device according to the target sending path;
wherein a data type of the path information is Boolean; and
when a value of the path information is true, the target sending path is the mobile communication link; and when the value of the path information is false, the target sending path is the WLAN link;
or
when a value of the path information is true, the target sending path is the WLAN link; and when the value of the path information is false, the target sending path is the mobile communication link.

2. The method of claim 1, wherein configuring path information for a terminal comprises:
setting, by the network access device, the path information in a designated System Information Block (SIB) of system information, the designated SIB being an original SIB or a new SIB in the system information.

3. The method of claim 2, wherein issuing the path information to the terminal comprises:
broadcasting, by the network access device, the system information to respective terminals, the terminals being configured to determine the target sending path according to the path information included in the designated SIB of the system information, and send the uplink data to the network access device through the target sending path;
wherein the path information included in the system information broadcast to different terminals is identical.

4. The method of claim 1, wherein configuring path information for a terminal comprises:
setting, by the network access device, the path information in RRC connection reconfiguration signaling.

5. The method of claim 4, wherein issuing the path information to the terminal comprises:
sending, by the network access device, the RRC connection reconfiguration signaling to the terminal, the terminal being configured to determine the target sending path according to the path information included in the RRC connection reconfiguration signaling, and send the uplink data to the network access device through the target sending path;

wherein the path information included in the RRC connection reconfiguration signaling sent to different terminals is identical or different.

6. A data sending method, comprising:

receiving, by a terminal, path information issued by a network access device, a Radio Resource Control (RRC) connection being established between the network access device and the terminal, the path information being configured to indicate a sending path of uplink data, and the sending path including a mobile communication link or a Wireless Local Area Network (WLAN) link;

determining, by the terminal, a target sending path of uplink data according to the path information; and sending, by the terminal, the uplink data to the network access device according to the target sending path, wherein a data type of the path information is Boolean; and when a value of the path information is true, the terminal determines the target sending path to be the mobile communication link; and when the value of the path information is false, the terminal determines the target sending path to be the WLAN link;

or when a value of the path information is true, the terminal determines the target sending path to be the WLAN link; and when the value of the path information is false, the terminal determines the target sending path to be the mobile communication link.

7. The method of claim 6, wherein receiving path information issued by a network access device comprises:

receiving, by the terminal, system information broadcast by the network access device, a designated System Information Block (SIB) of the system information including the path information, and the designated SIB being an original SIB or a new SIB in the system information.

8. The method of claim 6, wherein receiving path information issued by a network access device comprises:

receiving, by the terminal, RRC connection reconfiguration signaling sent by the network access device, the RRC connection reconfiguration signaling including the path information, and the path information included in the RRC connection reconfiguration signaling sent to different terminals being identical or different.

9. The method of claim 6, further comprising:

detecting, by the terminal, whether the path information issued by the network access device exists;

when the path information issued by the network access device exists, performing, by the terminal, the step of determining a target sending path of uplink data according to the path information; and when the path information issued by the network access device does not exist, sending, by the terminal, the uplink data through the mobile communication link.

10. A network access device, comprising:

a processor; and a memory configured to store instructions executable by the processor;

wherein the processor is configured to:

configure path information for a terminal, a Radio Resource Control (RRC) connection being established between the network access device and the terminal, the path information being configured to indicate a sending path of uplink data, and the sending path including a mobile communication link or a Wireless Local Area Network (WLAN) link; and issue the path information to the terminal, the terminal being configured to determine a target sending path of uplink data according to the path information, and send the uplink data to the network access device according to the target sending path, wherein a data type of the path information is Boolean; and when a value of the path information is true, the target sending path is the mobile communication link; and when the value of the path information is false, the target sending path is the WLAN link;

or when a value of the path information is true, the target sending path is the WLAN link; and when the value of the path information is false, the target sending path is the mobile communication link.

11. The network access device of claim 10, wherein the processor is configured to set the path information in a designated System Information Block (SIB) of system information, the designated SIB being an original SIB or a new SIB in the system information.

12. The network access device of claim 11, wherein the processor is configured to broadcast the system information to respective terminals, the terminals being configured to determine the target sending path according to the path information included in the designated SIB of the system information, and send the uplink data to the network access device through the target sending path;

wherein the path information included in the system information broadcast to different terminals is identical.

13. The network access device of claim 10, wherein the processor is configured to set the path information in RRC connection reconfiguration signaling.

14. The network access device of claim 13, wherein the processor is configured to send the RRC connection reconfiguration signaling to the terminal, the terminal being configured to determine the target sending path according to the path information included in the RRC connection reconfiguration signaling, and send the uplink data to the network access device through the target sending path;

wherein the path information included in the RRC connection reconfiguration signaling sent to different terminals is identical or different.

15. A terminal, comprising:

a processor; and a memory configured to store instructions executable by the processor;

wherein the processor is configured to:

receive path information issued by a network access device, a Radio Resource Control (RRC) connection being established between the network access device and the terminal, the path information being configured to indicate a sending path of uplink data, and the sending path including a mobile communication link or a Wireless Local Area Network (WLAN) link;

determine a target sending path of uplink data according to the path information; and send the uplink data to the network access device according to the target sending path, wherein a data type of the path information is Boolean; and the processor is further configured to:

determine the target sending path to be the mobile communication link when a value of the path information is true, and determine the target sending path to be the WLAN link when the value of the path information is false;

or determine the target sending path to be the WLAN link when a value of the path information is true, and determine the target sending path to be the mobile communication link when the value of the path information is false.

16. The terminal of claim 15, wherein the processor is further configured to:

receive system information broadcast by the network access device, a designated System Information Block (SIB) of the system information including the path information, and the designated SIB being an original SIB or a new SIB of the system information.

17. The terminal of claim 15, wherein the processor is further configured to:

receive RRC connection reconfiguration signaling sent by the network access device, the RRC connection reconfiguration signaling including the path information, and the path information included in the RRC connection reconfiguration signaling sent to different terminals being identical or different.

18. The terminal of claim 15, wherein the processor is further configured to:

detect whether the path information issued by the network access device exists;

determine the target sending path of uplink data according to the path information when the path information issued by the network access device exists; and send the uplink data through the mobile communication link when the path information issued by the network access device does not exist.

* * * * *